United States Patent [19]

Morgan et al.

[11] 3,714,619
[45] Jan. 30, 1973

[54] UNIVERSAL TRANSDUCER MOUNTING BRACKET AND ASSEMBLY

[75] Inventors: Robert A. Morgan, State College; Paul A. Rishel, Centre Hall, both of Pa.

[73] Assignee: Maschinenfabrik Gehring KG, Nellingen A.F., Germany

[22] Filed: Sept. 15, 1971

[21] Appl. No.: 180,617

[52] U.S. Cl. ................. 340/8 S, 248/291, 310/9.1, 340/8 R
[51] Int. Cl. .......................... H04r 1/44, A47f 5/10
[58] Field of Search ...... 340/8, 8 S; 310/9.1; 248/291

[56] References Cited

UNITED STATES PATENTS

| | | | |
|---|---|---|---|
| 3,082,623 | 3/1963 | Bosland | 248/29 X |
| 3,521,225 | 7/1970 | Kursman et al. | 340/8 R |

*Primary Examiner*—Benjamin A. Borchelt
*Assistant Examiner*—H. J. Tudor
*Attorney*—E. F. Wenderoth et al.

[57] ABSTRACT

A mounting bracket includes a rectangular plate having an elongated alignment opening and mounting holes therein. Integral with one transverse edge of the plate are a pair of staggered bent hinge portions. An acoustic transducer housing has an exteriorly threaded stem extending therefrom and a bevelled leading edge. The stem extends through the alignment opening of a first plate with the hinge portions extending toward the boat. A second plate is attached to the transom of the boat. The plates are connected by a bolt extending through the hinge portions with the front of the bevelled edge of the housing contacting the edge of the hull of the boat. The position of the housing with respect to the transom is adjustable by means of the elongated alignment openings in the bracket plates.

6 Claims, 4 Drawing Figures

Patented Jan. 30, 1973

INVENTORS
ROBERT A. MORGAN
PAUL A. RISHEL

BY Wendsworth, Lind & Poack
ATTORNEYS

UNIVERSAL TRANSDUCER MOUNTING BRACKET AND ASSEMBLY

BACKGROUND OF THE INVENTION

The present invention relates to a mounting bracket and transducer assembly for mounting an acoustic transducer to the transom of the boat. More specifically, the present invention relates to such a mounting bracket and assembly which may be universally mounted on the transoms of any style boat.

It has become increasingly desirable to use acoustic transducers with relatively small boats for determining water depth and for locating fish. This is done by positioning an acoustic transducer in the water and sending timed electrical pulses to the transducer. The transducer converts these electrical pulses into acoustic pulses and sends them downwardly into the water. When the acoustic pulses reach the floor of the water or an object such as fish in the water, the acoustic pulses bounce back and are received by the acoustic transducer. The acoustic transducer then reconverts these acoustic pulses into electric pulses which are used in a known manner to determine the depth of the water or the location of the fish therein.

A number of ways are used to position the transducer in the water. A first method is to merely hang the transducer over the side of the boat. However, this method has obvious disadvantages in that the transducer is not rigidly positioned, particularly when the boat is moving through the water. Another method of mounting the transducer is to extend an integral stem thereof through a hole in the hull of the boat. However, this method if expensive and results in obvious damage to the boat. A third method of mounting the transducer is to position the transducer on the transom of the boat by means of a mounting bracket. However, when a device is mounted in such a manner as to trail the boat, when the boat moves through the water there occurs an undesirable phenomenon in that a stream of water is driven upwardly between the transom of the boat and the device. This stream of water is referred to as a "rooster tail."

One prior art attempt to provide a solution for this problem is illustrated in U.S. Pat. No. 3,521,225. In this patent there is provided a mounting bracket having a face plate attached to the transom of the boat by screws. A pair of ears extend outwardly from the face plate and have therein aligned holes. The housing of the transducer assembly has a hole therethrough on the leading edge aligned with the holes in the ears of the mounting bracket. A bolt extends through the holes in the ears and the transducer housing to rigidly secure the housing of the mounting bracket. The assembled housing and bracket are aligned such that the bottom of the housing aligns with the bottom of the boat, and then the bracket is secured to the transom of the boat by screws. It is said that to eliminate the "rooster tail" spray, the leading edge of the housing is shaped as an arc having its center of curvature at the axial center of the hole through the housing and this radius of curvature is substantially equal to the perpendicular distance from the centers of the holes in the ears of the mounting bracket to the surface of the face plate of the mounting bracket. However, it is in practice extremely difficult to mount this prior art bracket and transducer assembly in the properly desired alignment on the boat.

OBJECTS AND BRIEF DESCRIPTION OF THE INVENTION

With the above discussion in mind, it is the primary object of the present invention to provide a simplified mounting bracket and transducer assembly whereby an acoustic transducer may be easily and accurately mounted on the transom of a boat.

It is a further object of the present invention to provide such an assembly which may be mounted on the transom of a boat of any style and shape.

It is a still further object of the present invention to provide such an assembly wherein the acoustic transducer may be precisely and exactly positioned with ease.

It is even a still further object of the present invention to provide such an assembly whereby "rooster tail" spray is eliminated.

These objects are achieved in accordance with the present invention by the provision of a transducer including a housing having a bevelled leading edge and a stem having exterior threads extending upwardly therefrom. The mounting bracket includes two identical flat rectangular brackets having elongated alignment openings in the longitudinal dimension thereof. A plurality of mounting holes extend through the bracket at suitable locations therein. Integral with one transverse edge of the bracket are a pair of bent hinge portions extending beyond the plane of only one of the surfaces of the bracket. A first of the brackets is positioned over the stem of the housing by means of the elongated alignment opening with the hinge portions positioned upwardly and toward the bevelled leading edge of the housing. The second of the brackets is attached to the transom of the boat by means such as screws extending through the mounting holes, with the hinge portions extending downwardly and rearwardly of the boat. The hinges of the two brackets are then interconnected by suitable means such as a bolt and nut. The first bracket may be adjusted with respect to the housing stem along its elongated alignment opening until the housing is positioned such that the bottom thereof aligns with the bottom of the boat and the bevelled leading edge thereof is precisely in contact with the edge of the hull of the boat. The first bracket is then secured to the housing by means such as a nut.

Other objects, features and advantages of the present invention will be made clear from the following detailed description taken together with the accompanying drawings.

DESCRIPTION OF THE PRIOR ART

Figure 1:
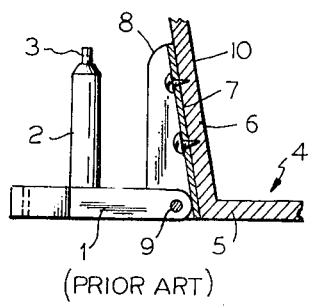
FIG. 1 is a side view, partially in elevation and partially in cross-section, illustrating a prior art means of mounting an acoustic transducer to the transom of a boat.

Before proceeding with a detailed description of the present invention, the operation of the mounting bracket assembly illustrated in U.S. Pat. No. 3,521,225 will be described. An acoustic transducer housing 1 has an integral stem 2 extending upwardly therefrom. An electrical cable 3 extends from stem 2 and is designed to extend to various equipment within the boat. A boat 4 includes a bottom 5 and a transom 6. A mounting bracket includes a face plate 7 and a pair of ears 8 extending outwardly therefrom. Each of the ears 8 has therein adjacent the bottom portion thereof aligned holes. Adjacent the leading edge of the transducer housing 1 is a transverse hole. The transducer housing 1 is dimensioned to fit between the ears 8, and the hole in the housing is adapted to align with the holes in the ears. The mounting bracket and the housing are assembled by means of a bolt 9 extending through the holes in the ears and the hole in the housing. The bracket is then aligned such that the bottom of housing 1 aligns with the bottom 5 of the boat, and then the bracket is attached to the transom 6 by means of screws 10. It is said that to avoid a "rooster tail" spray, the leading edge of the transducer housing is shaped as an arc having its center of curvature at the axial center of the hole through the housing. In addition, the radius of this curvature is substantially equal to the perpendicular distance from the centers of the holes through the ears to the surface of face plate 7 of the bracket. It is thereby said that the leading edge of the housing is brought into contact with the surface of the face plate, thereby preventing any "rooster tail" spray.

However, as will be apparent from the above discussion, it is extremely difficult in practice to accurately mount the bracket such that the bottom of housing 1 is aligned with the bottom 5 of the boat. Also, it will be apparent that if bolt 9 becomes even slightly loosened, the housing 1 will be free to swing around the axis of bolt 9.

DETAILED DESCRIPTION OF THE PRESENT INVENTION

With the above discussion in mind, a preferred embodiment of the mounting bracket and transducer assembly in accordance with the present invention will be described in detail.

Figure 2:
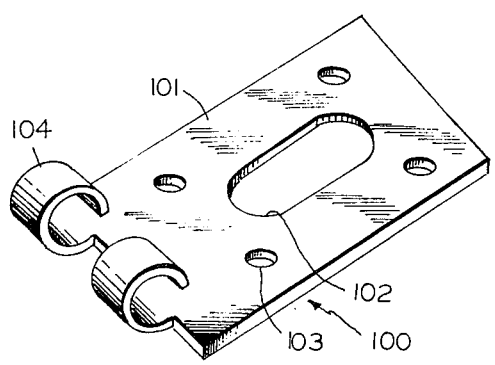
FIG. 2 is a perspective view of one mounting bracket used in accordance with the present invention.

The mounting bracket of the present invention includes a pair of brackets 100 each comprising a flat, preferably rectangular plate 101, as shown in FIG. 2. At approximately the center of the plate and extending in the longitudinal direction thereof is an elongated alignment opening 102. At suitable locations around the plate 101 are located mounting holes 103. Extending integrally from one transverse edge of plate 101 are bent hinge portions 104. In the illustrated embodiment, two hinge portions 104 are provided on each bracket 100. However, it is to be understood that any suitable or desirable number of hinge portions could be provided. It will also be apparent from FIGS. 2 and 4 that the location of hinge portions 104 with respect to plate 101 is such that the hinge portions are integrally staggered along the transverse edge thereof extending above the plane of only one surface thereof. Therefore, as is particularly shown in FIG. 4, bracket 100a is precisely the same as bracket 100b, but may be interlocked therewith. The above arrangement is a desirable concept of the present invention. However, it will be apparent to those skilled in the art that such is not absolutely necessary.

A transducer housing 105 has an integral stem 106 extending upwardly therefrom. Stem 106 is exteriorly threaded. The leading end of housing 105 is bevelled as shown at 107 to provide a leading knife edge 108.

Figure 3:
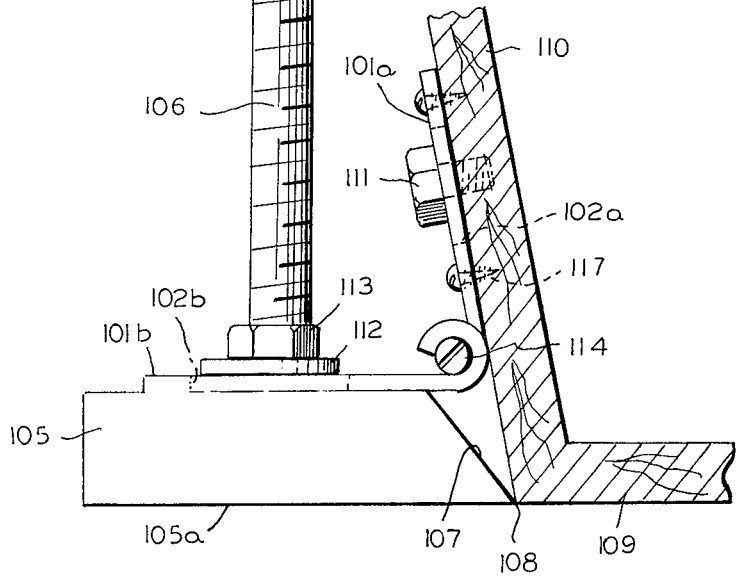
FIG. 3 is a side view, partially in elevation and partially in cross-section, of an acoustic transducer mounted to the transom of a boat in accordance with the present invention.

The manner of assembling the mounting bracket and transducer assembly of the present invention will now be described. As shown in FIG. 3, a flat bottom boat has a bottom 109 and a transom 110. A first bracket plate 101a is positioned in the desired position to transom 110 by means of screws 117 extending through mounting holes 103a. The second bracket plate 101b is mounted with the stem 106 of housing 105 extending through the elongated alignment opening 102b. Bracket plate 101b is loosely secured to housing 105 and stem 106 by means of a suitable washer 112 and nut 113 engaging the extrior threads of stem 106. Hinge portions 104a and 104b are interlocked and assembled by suitable means such as machine bolt 114, lock washer 115 and nut 116.

After this preliminary assembling, bracket plate is adjusted with respect to stem 106 along the elongated alignment opening 102b such that the lower edge 105a of housing 105 is aligned with the bottom 109 of the boat, and such that leading knife edge 108 of housing 105 is precisely in engagement with the edge of the hull of the boat, as shown in FIG. 3. When this alignment is achieved, nut 113 is tightened, thereby rigidly positioning bracket plate 101b with respect to the housing 105. Furthermore, bolt 114 and nut 116 extending through the hinge portions of the bracket plates are tightened.

Figure 4:
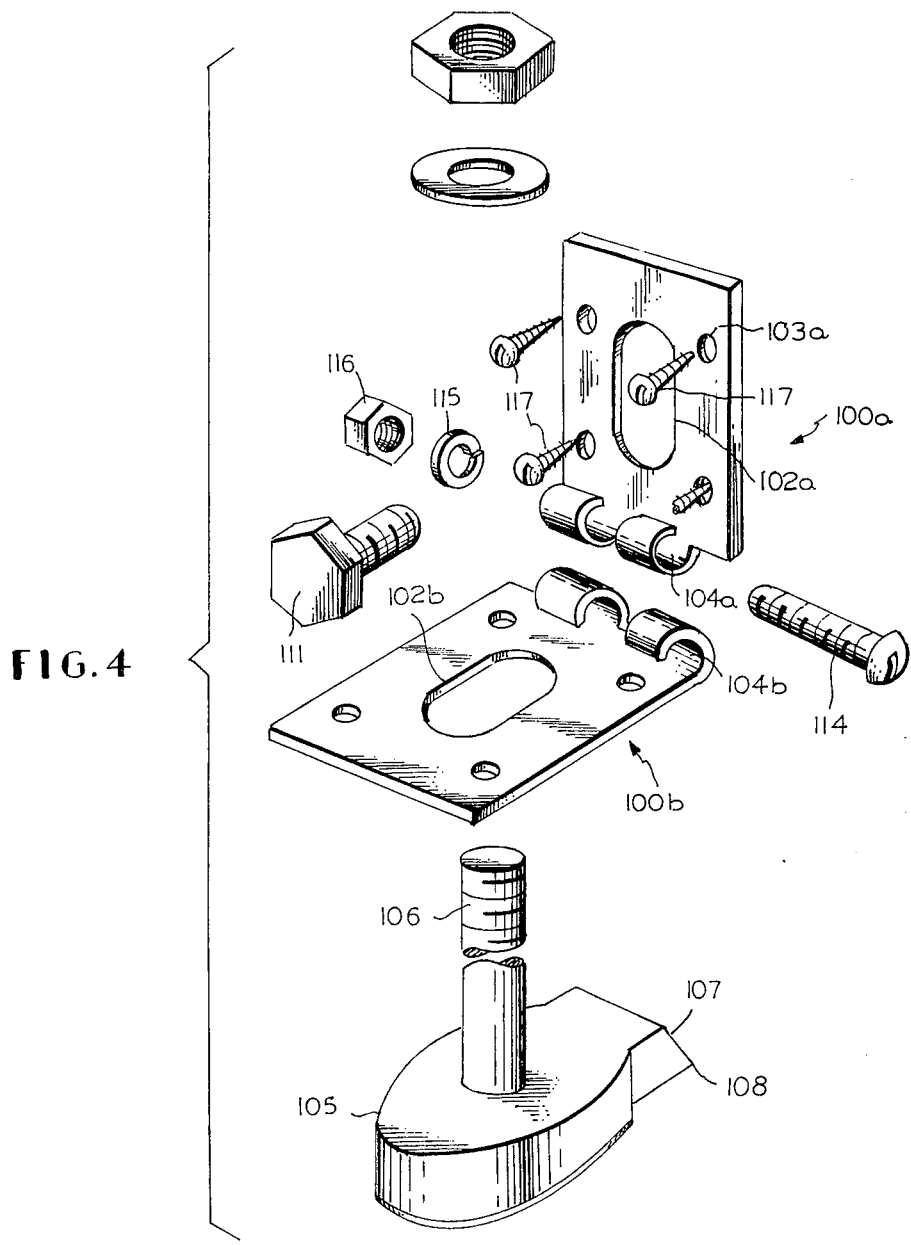
FIG. 4 is an exploded perspective view of the assembly illustrated in FIG. 3.

Also shown in FIGS. 3 and 4 is a positioning bolt 111 which may, if desired, be used to approximately initially position first bracket plate 101a with respect to transom 110. Specifically, plate 101a may be initially positioned with respect to transom 110 by extending positioning bolt 111 through alignment opening 102a. In this instance, screws 117 would be inserted through mounting holes 103a into transom 110 after all of the other elements are securely fastened.

It will be apparent from the above discussion that the present invention provides a means for mounting an acoustic transducer to the transom of a boat much more precisely and efficiently then in prior art methods. Specifically, only a single relatively inexpensive mounting bracket plate need be designed. A pair of these bracket plates may then interchangeably be used in the mounting bracket assembly of the present invention. Additionally, it will be apparent that by means of elongated alignment openings 102, the transducer assembly may be preliminarily aligned and attached to the boat, and adjustment of the position thereof may be readily and easily made. It will also be apparent that after the preliminary positioning and alignment of the assembly, that the mounting brackets may then be rigidly secured in place. Due to the rigid and precise alignment, it is readily possible to eliminate any "rooster spray."

Although preferred embodiments of the invention have been described in detail, such description is intended to be illustrative only and not restrictive, since many details of the construction of the invention may be altered or modified without departing from the spirit or scope thereof.

What is claimed is:

1. A mounting bracket and transducer assembly for mounting an acoustic transducer to the transom of a boat, said assembly comprising a transducer housing having a stem extending therefrom and a bevelled leading end forming a leading knife edge; a pair of mounting plates, each of said plates having an elongated alignment opening and mounting holes therein and means extending from one edge thereof for securing said plates together; a first of said plates adjustably securable to said housing by positioning said stem through said alignment opening; and a second of said plates securable to said transom by said mounting holes.

2. An assembly as claimed in claim 1, wherein each of said plates comprise identical rectangular plates, said alignment openings being elongated in the longitudinal direction thereof.

3. An assembly as claimed in claim 2, wherein said securing means of each of said plates comprise staggered integral bent hinge portions extending from a transverse edge thereof, said hinge portions extending beyond the plane of only one of the surfaces of said plate.

4. An assembly as claimed in claim 3, further comprising means extending through said bent hinge portions for adjustably securing said plates together.

5. An assembly as claimed in claim 4, further comprising means engageable with said stem to rigidly secure said first plate to said housing.

6. An assembly as claimed in claim 1, further comprising means extending through said alignment opening of said second plate for adjustably securing said second plate to said transom.

* * * * *

UNITED STATES PATENT OFFICE
CERTIFICATE OF CORRECTION

Patent No. 3,714,619  Dated January 30, 1973

Inventor(s) Robert A. Morgan and Paul A. Rishel

It is certified that error appears in the above-identified patent and that said Letters Patent are hereby corrected as shown below:

In the printed heading of the above identified patent, kindly correctly list the assignee to read --LINDEN LABORATORIES, INC.,
St. College, Pa. -- .

Signed and sealed this 20th day of November 1973.

(SEAL)
Attest:

EDWARD M. FLETCHER, JR.
Attesting Officer

RENE D. TEGTMEYER
Acting Commissioner of Patents